US012578065B2

(12) United States Patent
Furuichi et al.

(10) Patent No.: US 12,578,065 B2
(45) Date of Patent: Mar. 17, 2026

(54) MANAGEMENT SYSTEM AND MANAGEMENT METHOD, AND COMPUTER-READABLE STORAGE MEDIUM

(71) Applicant: Chiyoda Corporation, Yokohama (JP)

(72) Inventors: Kazuya Furuichi, Yokohama (JP); Ryosuke Kurono, Yokohama (JP); Ko Nureki, Yokohama (JP)

(73) Assignee: Chiyoda Corporation, Yokohama (JP)

( * ) Notice: Subject to any disclaimer, the term of this patent is extended or adjusted under 35 U.S.C. 154(b) by 477 days.

(21) Appl. No.: 18/187,016

(22) Filed: Mar. 21, 2023

(65) Prior Publication Data

US 2023/0280000 A1 Sep. 7, 2023

Related U.S. Application Data

(63) Continuation of application No. PCT/JP2021/026199, filed on Jul. 13, 2021.

(51) Int. Cl.

| | |
|---|---|
| ***F17D 5/06*** | (2006.01) |
| ***F17D 1/14*** | (2006.01) |
| ***F17D 3/18*** | (2006.01) |

(52) U.S. Cl.

CPC ................ *F17D 5/06* (2013.01); *F17D 3/18* (2013.01); *F17D 1/14* (2013.01)

(58) Field of Classification Search

CPC ... F17D 5/06; F17D 5/02; F17D 5/005; F17D 5/00; F17D 3/18; F17D 3/16; F17D 3/145; F17D 3/14; F17D 3/12; F17D 3/10; F17D 3/00; F17D 1/14; F17D 1/04; F17D 1/02; F17D 1/00; F17D 1/08; F17D 3/01; G05B 19/418; G05B 19/02; G05B 19/00

See application file for complete search history.

(56) References Cited

U.S. PATENT DOCUMENTS

| | | | | |
|---|---|---|---|---|
| 5,623,109 | A | 4/1997 | Uchida et al. | |
| 9,897,259 | B1 * | 2/2018 | Mancilla | G05D 7/0641 |
| 10,437,265 | B2 * | 10/2019 | Pyötsiä | G05B 19/0426 |
| 2018/0299075 | A1 * | 10/2018 | Esmaili | G05B 13/0265 |
| 2021/0088986 | A1 | 3/2021 | Furuichi et al. | |

FOREIGN PATENT DOCUMENTS

| | | | |
|---|---|---|---|
| JP | H02183814 | A | 7/1990 |
| JP | H06331507 | A | 12/1994 |
| JP | H07121230 | A | 5/1995 |

(Continued)

OTHER PUBLICATIONS

International Search Report issue on Oct. 12, 2021, in corresponding International Patent Application No. PCT/JP2021/026199, 5 pages.

*Primary Examiner* — Mohamed Charioui

(74) *Attorney, Agent, or Firm* — Maier & Maier, PLLC

(57) ABSTRACT

A management system for managing an operating condition for a pipeline that processes fluid, the management system including a processor configured to: obtain measurement values from sensors provided in devices that constitute the pipeline; and estimate a maximum processing amount of the fluid in the entire pipeline in operation by inputting the measurement values obtained from the sensors into a physical model that is built based on physical properties of the devices.

11 Claims, 10 Drawing Sheets

(56) References Cited

FOREIGN PATENT DOCUMENTS

| | | | | |
|---|---|---|---|---|
| JP | 2601895 | B2 | 4/1997 | |
| JP | 2004217800 | A | 8/2004 | |
| JP | 2004310674 | A | 11/2004 | |
| JP | 4546332 | B2 | 9/2010 | |
| JP | 2015176219 | A | 10/2015 | |
| JP | 2019204145 | A | 11/2019 | |
| JP | 2020126404 | A | 8/2020 | |
| WO | WO-2011104419 | A1 * | 9/2011 | ......... G05B 23/0235 |
| WO | 2019234913 | A1 | 12/2019 | |
| WO | 2020227383 | A1 | 11/2020 | |

* cited by examiner

Figure 3

2021

| PROCESS DATA DB | | | |
|---|---|---|---|
| SENSOR ID | DEVICE NAME | SENSOR NAME | MEASUREMENT VALUE |
| #10001 | PUMP A | PRESSURE GAGE | ··· |
| #10002 | PUMP A | FLOWMETER | ··· |
| #10003 | PUMP A | THERMOMETER | ··· |
| ··· | PUMP B | PRESSURE GAGE | ··· |
| ··· | PUMP B | FLOWMETER | ··· |
| ··· | PUMP B | THERMOMETER | ·· |
| ··· | HEAT EXCHANGER | ··· | ·· |
| ··· | ··· | ··· | ·· |
| ··· | ··· | ··· | ·· |
| ··· | ··· | ··· | ·· |

2022

| DEVICE DATA DB | | | |
|---|---|---|---|
| SENSOR ID | DEVICE NAME | SENSOR NAME | MEASUREMENT VALUE |
| #20001 | VALVE A | VALVE OPENING INDICATOR | ··· |
| #20002 | VALVE B | VALVE OPENING INDICATOR | ··· |
| #20003 | VALVE C | VALVE OPENING INDICATOR | ··· |
| ··· | VALVE D | VALVE OPENING INDICATOR | ··· |
| ··· | ··· | ··· | ··· |
| ··· | ··· | ··· | ·· |
| ··· | ··· | ··· | ·· |
| ··· | ··· | ··· | ·· |
| ··· | ··· | ··· | ·· |
| ··· | ··· | ··· | ·· |

Figure 5A

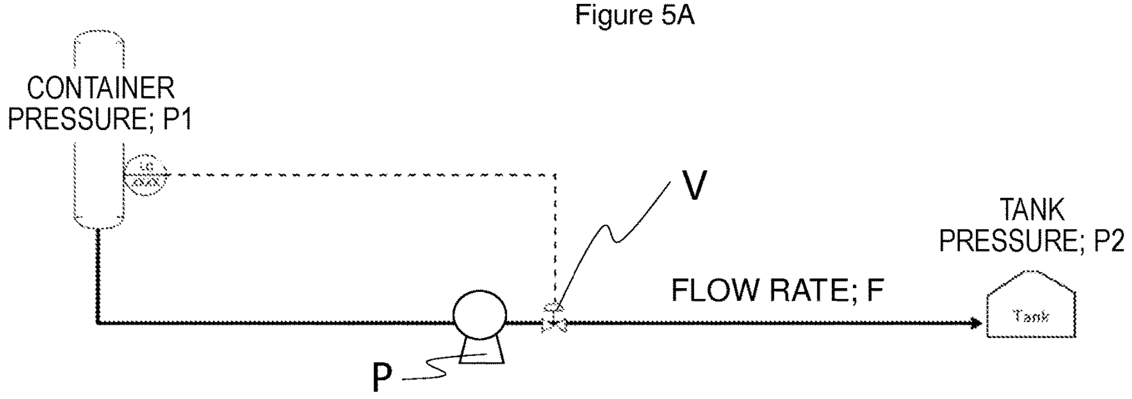

Figure 5B

| CONTAINER PRESSURE (ACTUALLY MEASURED VALUE) | VALVE OPENING DEGREE (ACTUALLY MEASURED VALUE) | FLOW RATE (ACTUALLY MEASURED VALUE) | | TANK PRESSURE (PREDICTED VALUE) | | TANK PRESSURE (ACTUALLY MEASURED VALUE) |
|---|---|---|---|---|---|---|
| P1 | | | | PREDICTED P2 | | P2 |
| kPaG | % | m3/h | | kPa | | kPaG |
| 500 | 55 | 120 | => | 195 | ⇔ | 200 |

Figure 5C

| CONTAINER PRESSURE (ACTUALLY MEASURED VALUE) | TOLERABLE MAX DEGREE OF OPENING | VARIABLE | | TANK PRESSURE (PREDICTED VALUE) | | TANK PRESSURE (ACTUALLY MEASURED VALUE) |
|---|---|---|---|---|---|---|
| P1 | VALVE OPENING DEGREE | FLOW RATE | | PREDICTED P2 | | P2 |
| kPaG | % | m3/h | | kPa | | kPaG |
| 500 | 85% | 140 | => | 300 | ⇔ | 200 |
| 500 | 85% | 160 | => | 250 | ⇔ | 200 |
| 500 | 85% | 180 | => | 200 | ⇔ | 200 |
| 500 | 85% | 200 | => | 150 | ⇔ | 200 |
| 500 | 85% | 220 | => | 100 | ⇔ | 200 |
| 500 | 85% | 240 | => | 50 | ⇔ | 200 |

Figure 9A

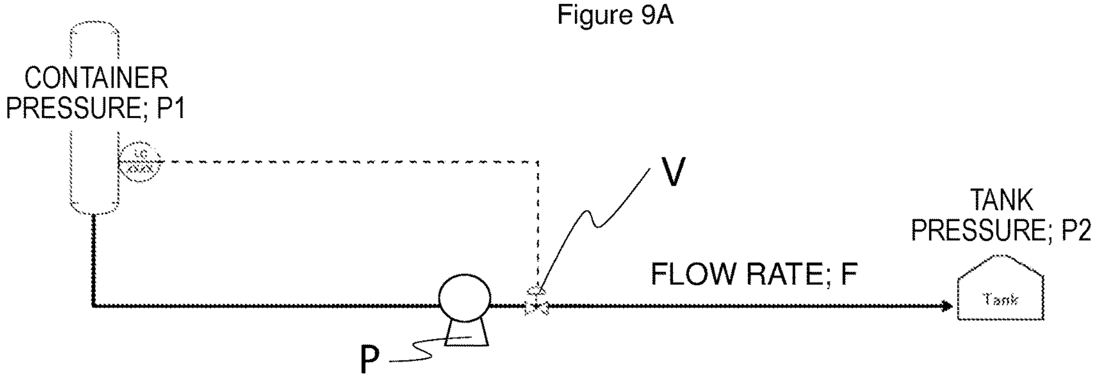

Figure 9B

| CONTAINER PRESSURE (ACTUALLY MEASURED VALUE) | ACTUALLY MEASURED VALUE OF VALVE OPENING DEGREE | ACTUALLY MEASURED VALUE OF FLOW RATE | Kpipe1 (VARIABLE) | ΔPpipe1 | Kpipe2 (VARIABLE) | ΔPpipe2 | ΔPcv | | TANK PRESSURE (PREDICTED VALUE) | | TANK PRESSURE (ACTUALLY MEASURED VALUE) |
|---|---|---|---|---|---|---|---|---|---|---|---|
| P1 | | | | | | | | | PREDICTED P2 | | P2 |
| kPaG | % | m3/h | - | kPa | - | kPa | kPa | | kPa | | kPaG |
| 500 | 55 | 120 | 1.75 | -52.5 | 0.84 | -58.8 | -155 | => | 233.7 | ⇔ | 200 |
| 500 | 55 | 120 | 1.9 | -57 | 1.03 | -72.1 | -155 | => | 215.9 | ⇔ | 200 |
| 500 | 55 | 120 | 1.94 | -58.2 | 0.95 | -66.5 | -155 | => | 220.3 | ⇔ | 200 |
| 500 | 55 | 120 | 2.12 | -63.6 | 1.54 | -107.8 | -155 | => | 173.6 | ⇔ | 200 |
| 500 | 55 | 120 | 1.83 | -54.9 | 1.23 | -86.1 | -155 | => | 204 | ⇔ | 200 |

=> Determine to use this k1 (G)

=> Determine to use this k2 (G)

Figure 9C

| CONTAINER PRESSURE (ACTUALLY MEASURED VALUE) | TOLERABLE MAX DEGREE OF OPENING | VARIABLE | Kpipe1 | ΔPpipe1 | Kpipe2 | ΔPpipe2 | ΔPcv | | TANK PRESSURE (PREDICTED VALUE) | | TANK PRESSURE (ACTUALLY MEASURED VALUE) |
|---|---|---|---|---|---|---|---|---|---|---|---|
| P1 | VALVE OPENING DEGREE | FLOW RATE | | | | | | | PREDICTED P2 | | P2 |
| kPaG | % | m3/h | - | kPa | - | kPa | kPa | | kPa | | kPaG |
| 500 | 85% | 140 | 1.83 | -90 | 1.23 | -100 | -10 | => | 300 | ⇔ | 200 |
| 500 | 85% | 160 | 1.83 | -110 | 1.23 | -120 | -20 | => | 250 | ⇔ | 200 |
| 500 | 85% | 180 | 1.83 | -130 | 1.23 | -140 | -30 | => | 200 | ⇔ | 200 |
| 500 | 85% | 200 | 1.83 | -150 | 1.23 | -160 | -40 | => | 150 | ⇔ | 200 |
| 500 | 85% | 220 | 1.83 | -170 | 1.23 | -180 | -50 | => | 100 | ⇔ | 200 |
| 500 | 85% | 240 | 1.83 | -190 | 1.23 | -200 | -60 | => | 50 | ⇔ | 200 |

MANAGEMENT SYSTEM AND MANAGEMENT METHOD, AND COMPUTER-READABLE STORAGE MEDIUM

CROSS-REFERENCE TO RELATED APPLICATIONS

This application is based upon and claims the benefit of priority from PCT Patent Application No. PCT/JP2021/026199, filed Jul. 13, 2021 the entire contents of which are incorporated herein by reference.

FIELD

The present disclosure relates to a management system and a management method, and a computer-readable storage medium.

BACKGROUND

A management system that optimally controls a drainpipe network in a drainage facility has been known. As such a system, it is known a process of estimating a degree of opening of a control valve by inputting measured process values (pressure, flow rate) into a physical model that is built based on an operation and a change in pressure at each control point in a drainage facility.

In such a drainage facility, it suffices to adjust the degree of opening of the control valve with consideration given to changes in pressure and flow rate.

In contrast, in a case of a pipeline in which a product is retained in a tank such as a chemical plant, there are a wide variety of factors that influence processing amounts in branched lines of the pipeline, such as an amount of retention in the tank, changes in pressure balance of various devices over time, and an amount of supply in a previous process, and a processing performance of the pipeline fluctuates depending on an operating state.

There is a particular demand for accurately grasping such a maximum processing amount that fluctuates depending on changes in an operating state based on an operating condition or the like.

SUMMARY

An object of the present disclosure is thus to provide a management system that accurately estimates a maximum processing amount in a pipeline that processes fluid, from an operating condition of the pipeline.

BRIEF DESCRIPTION OF DRAWINGS

FIG. 3 is a diagram for describing an example of structures of databases stored in the server.

FIG. 5A is a diagram for describing an estimating calculation performed by the server.

FIG. 5B is a diagram for describing an estimating calculation performed by the server.

FIG. 5C is a diagram for describing an estimating calculation performed by the server.

FIG. 9A is a diagram for describing an estimating calculation performed by a server 20 of the management system 1 according to Modification 1.

FIG. 9B is a diagram for describing an estimating calculation performed by a server 20 of the management system 1 according to Modification 1.

FIG. 9C is a diagram for describing an estimating calculation performed by a server 20 of the management system 1 according to Modification 1.

DETAILED DESCRIPTION

Figure 1:
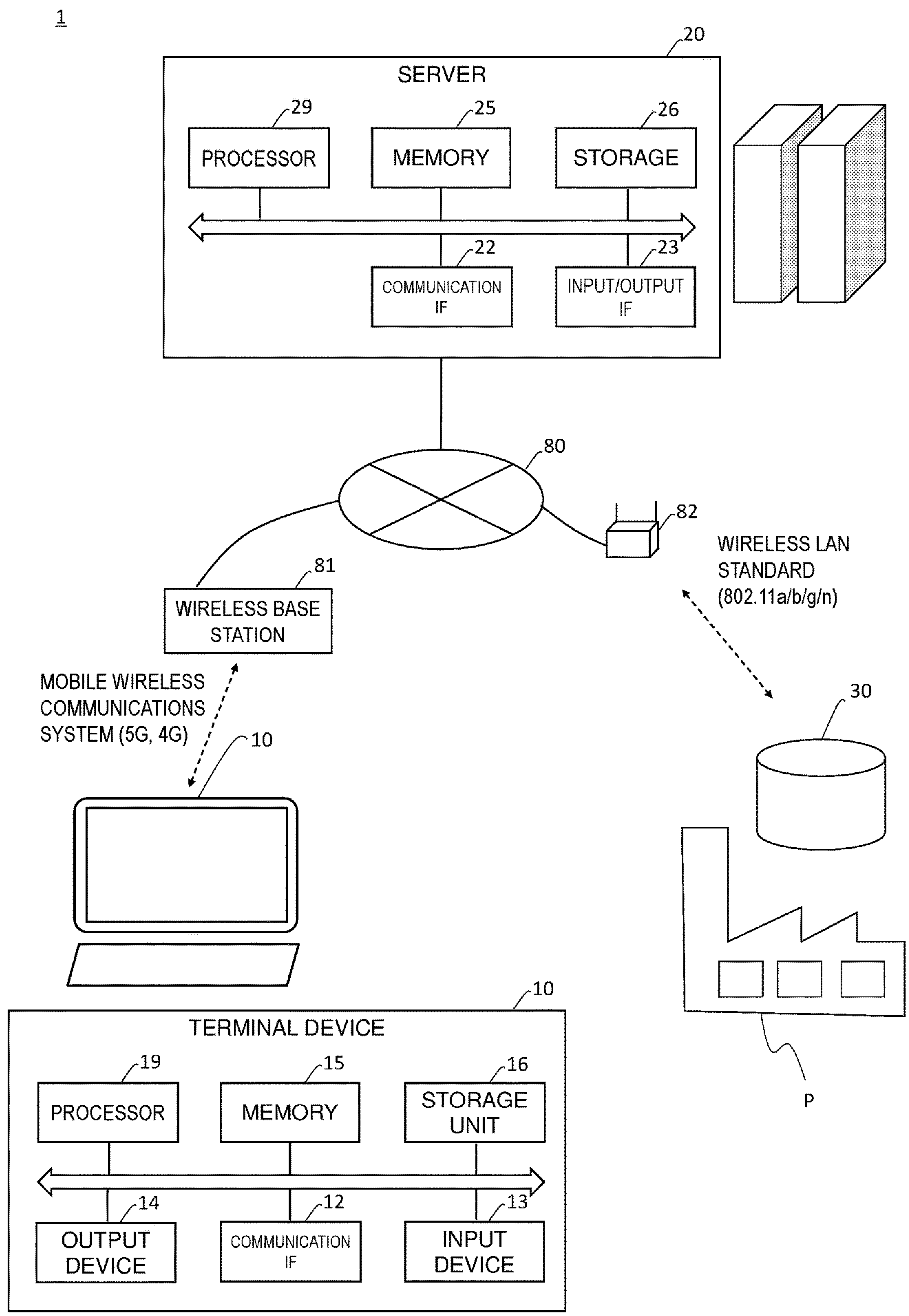
FIG. 1 is a diagram illustrating a general configuration of a management system.

In general, according to one embodiment, the management system for managing an operating condition for a pipeline that processes fluid includes a processor. The processor performs: a step of obtaining measurement values from sensors provided in devices that constitute the pipeline; and a step of estimating a maximum processing amount of the fluid in the entire pipeline in operation by inputting the measurement values obtained from the sensors into a physical model that is built based on physical properties of the devices.

An embodiment of the present disclosure will be described below with reference to the drawings. In the following description, the same components will be denoted by the same reference characters. The same components have the same name and the same function. Thus, the detailed description of the components will not be repeated.

1. Outline

A management system 1 for a pipeline (hereinafter, simply referred to as a management system 1) will be described below. The management system 1 is, for example, a system for controlling an operating condition for a pipeline for processing various types of fluid in facilities for producing a chemical product through various manufacturing processes involving chemical reactions, such as a liquefied natural gas (LNG) plant and a petrochemical plant. It should be noted that the management system 1 may be used in a facility for processing a fluid without large-scale chemical reactions, such as a sewerage facility and a water purification facility.

Facilities placed in a plant include, in a case of an LNG plant, an acid gas removal facility that removes acid gases ($H_2S$, $CO_2$, organic sulfur, etc.) contained in a source gas to be subjected to a liquefaction process, a sulfur recovery facility that recovers elemental sulfur from the removed acid gases, a water removal facility that removes water contained in the source gas, a compression facility that compresses a refrigerant used for cooling or liquefying the source gas (refrigerant mixture, propane refrigerant, etc.), and the like. Here, devices of a plant refer to various devices that are laid for purposes of the plant (hereinafter, referred to as devices). Concrete examples of the devices include a pipe, a tank, a pump, a valve, a heat exchanger, and the like.

The management system 1 will be described below. In the following description, by a user accessing a server 20 from a user terminal 10, the server 20 performs various types of computation to be described later using measurement values obtained from sensors of devices. The server 20 transmits results of the computation to the user terminal 10. The user terminal 10 presents the results of the computation by the server 20 to the user. In addition, based on the results of the computation, the server 20 determines operating conditions for devices on a pipeline, and checks and manages states of the devices based on the operating conditions.

2. General Configuration of Management System 1

Next, a general configuration of the management system 1 will be described. FIG. 1 is a diagram illustrating a general configuration of the management system 1.

As illustrated in FIG. 1, the management system 1 includes a plurality of user terminals 10 and the server 20. The user terminals 10 and the server 20 are connected together via a network 80, being capable of communicating with one another. The network 80 is configured as a wired or wireless network.

To the management system 1, a sensing database 30 for a plant in which a pipeline to be controlled is laid is connected via the network 80.

The user terminals 10 are devices operated by users. Here, the users are persons in charge of controlling the pipeline, which is a function of the management system 1, with the user terminals 10. The user terminals 10 are provided as the desktop personal computers (PCs), laptop PCs, and the like. In addition, the user terminals 10 may be provided as portable terminals supporting a mobile communications system such as tablet computers and smartphones.

The user terminals 10 are connected to the server 20 via a network 80, being capable of communicating with the server 20. The user terminals 10 are connected to the network 80 by communicating with a wireless base station 81 that supports a communications standard such as 5G and Long Term Evolution (LTE) and with a communication device such as a wireless LAN router 82 that supports a wireless local area network (LAN) standard, for example, the Institute of Electrical and Electronics Engineers (IEEE) 802.11.

As illustrated in FIG. 1, the user terminals 10 each include a communication interface (IF) 12, an input device 13, an output device 14, a memory 15, a storage 16, and a processor 19.

The communication IF 12 is an interface through which the user terminal 10 inputs and outputs signals to communicate with external equipment.

The input device 13 is an input device for receiving input operations from a user (e.g., a keyboard, a touch panel, a touchpad, a pointing device such as a mouse, etc.).

The output device 14 is an output device for presenting information to a user (a display, a speaker, etc.).

The memory 15 is for temporarily storing, for example, a program and data to be processed by the program or the like. For example, the memory 15 is a volatile memory such as a dynamic random access memory (DRAM).

The storage 16 is a storage device for saving data. For example, the storage 16 is a flash memory or a hard disc drive (HDD).

The processor 19 is hardware for executing a set of instructions written in the program. The processor 19 is constituted by an arithmetic unit, registers, peripheral circuits, and the like.

The server 20 is an apparatus that manages information on various types of equipment and various pipes, information concerning an operating condition for control, and information concerning a physical model used for the computational processing.

The server 20 receives inputs of instructions concerning the control of the operating condition for the pipeline, inputs of current operating states, and the like from the users who operate the user terminals 10.

Specifically, for example, the server 20 obtains the operating condition for the devices and the measurement values of the sensors and substitutes these values into the physical model to estimate a maximum processing amount. From the estimated maximum processing amount, the server 20 performs various processes described later such as detecting an operating reserve, a pressure balance and an anomaly. The server 20 displays results of the processes to the user terminals 10.

The server 20 is a computer connected to the network 80. The server 20 includes a communication IF 22, an input/output IF 23, a memory 25, a storage 26, and a processor 29.

The communication IF 22 is an interface through which the server 20 inputs and outputs signals to communicate with external equipment.

The input/output IF 23 functions as an interface with an input device for receiving input operations from the users and with an output device for presenting information to the users.

The memory 25 is for temporarily storing, for example, a program and data to be processed by the program or the like. For example, the memory 25 is a volatile memory such as a dynamic random access memory (DRAM).

The storage 26 is a storage device for saving data. For example, the storage 26 is a flash memory or a hard disc drive (HDD).

The processor 29 is hardware for executing a set of instructions written in the program. The processor 29 is constituted by an arithmetic unit, registers, peripheral circuits, and the like.

3. Functional Configuration of Server 20

Next, a functional configuration of the server 20 will be described.

Figure 2:
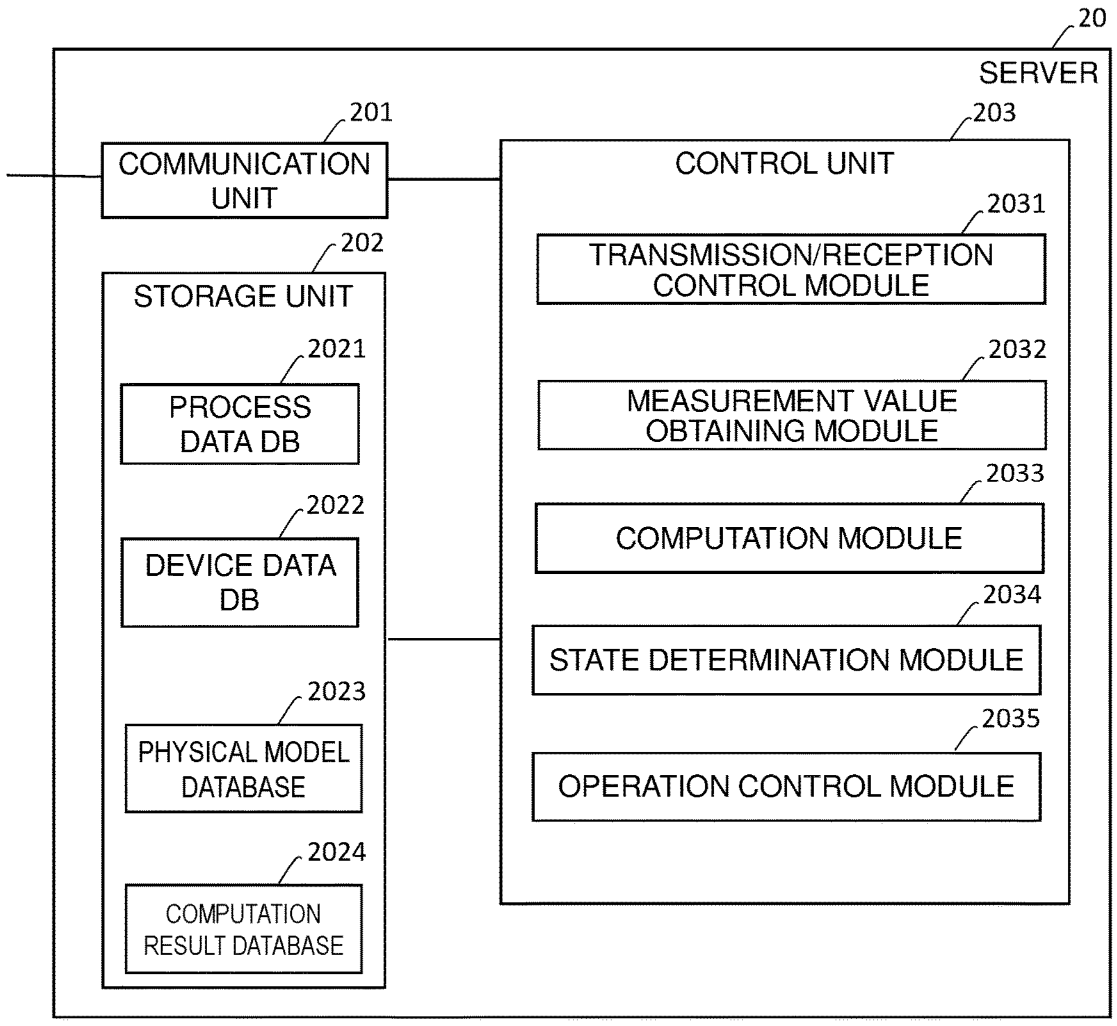
FIG. 2 is a diagram illustrating a functional configuration of a server included in the management system.

FIG. 2 is a diagram illustrating a functional configuration of the server 20 included in the management system 1. As illustrated in FIG. 2, the server 20 exercises functions as a communication unit 201, a storage unit 202, and a control unit 203.

The communication unit 201 performs such a process that the server 20 communicates with the external equipment.

The storage unit 202 stores the data and program to be used by the server 20. The storage unit 202 stores a process data DB 2021, a device data DB 2022, a physical model database 2023, and a computation result database 2024.

The process data DB 2021 is a database storing the measurement values obtained by the sensors that sense various physical quantities concerning states of fluid flowing by the devices. This will be described later in detail.

The device data DB 2022 is a database storing the measurement values obtained by the sensors that sense various physical quantities concerning states of the devices. This will be described later in detail.

The physical model database 2023 is a database storing a physical model that is built from operational properties (physical properties) of the devices. Such a physical model will be described with a valve as an example. As a flow rate property of a valve, a flow rate of fluid through the valve is written as a function of a degree of opening of the valve as a variable. The function is specified based on design values of the valve. The physical model refers to a function that describes the properties of the flow rate based on such design values of the valve. The physical model is calculated in advance for each of the devices that constitute the pipeline and stored in the physical model database 2023.

The computation result database 2024 is a database storing results of the various types of computation by the server 20. Specifically, the computation result database 2024 stores results of calculation as an intermediate process for using the measurement values from actual measurement for a computation with the physical model described later. In addition, the computation result database 2024 stores results output from the computation with the physical model.

The control unit 203 exercises functions as various modules including a transmission/reception control module 2031, a measurement value obtaining module 2032, a computation module 2033, a state determination module 2034, and an operation control module 2035 as the processor 29 of the server 20 performs processes according to the program.

The transmission/reception control module 2031 controls a process in which the server 20 transmits and receives signals to the external equipment according to the communications protocol.

The measurement value obtaining module 2032 obtains measurement values obtained by the sensors provided in the devices. The sensors from which the management system 1 obtains the measurement values include first sensors and second sensors.

The first sensors measure process data that indicates states of fluid flowing through the pipeline under the operating condition (historian data). Examples of the first sensors include a flowmeter, a thermometer, a pressure gage, and a water gage that are provided in the devices in advance. The first sensors are built in the devices.

The second sensors are sensors that measure device data indicating states of the devices under the operating condition. The second sensors include a group of sensors called IoT sensors, which are constituted by external modules retrofitted to the devices. The IoT sensors refer to sensors that are connected to a network to transmit measurement data to the server 20. The second sensors include opening sensors that mechanically measure a degree of opening of a valve. Note that the second sensors need not be the group of sensors constituted by external modules. The second sensors may be sensors provided in the devices in advance.

The computation module 2033 inputs the obtained measurement values of the sensors into the physical model stored in the physical model database 2023 to estimate operating states of the pipeline in operation.

The operating states estimated by the computation module 2033 include a maximum processing amount of fluid in the entire pipeline, an operating reserve, pressure balances between the devices, and the like. This will be described later in detail.

Based on the maximum processing amount estimated by the computation module 2033, the state determination module 2034 detects a deterioration in performance of each device. This will be described later in detail.

Based on the parameters estimated by the computation module 2033, the operation control module 2035 determines and suggests the operating condition. Specifically, for example, the operation control module 2035 suggests degrees of opening of valves included in the devices within the operating reserve. The operation control module 2035 also presents the operating condition for the devices with how much the performances of the devices have deteriorated and the like taken into account. Based on the presented operating condition, an operator can consider a new operating condition.

4. Data Structure

Next, an example of structures of databases stored in the server 20 will be described.

FIG. 3 is a diagram illustrating the example of the structures of the databases stored in the server 20. Note that the diagram is merely an example. The structures of the databases can be optionally changed.

As illustrated in FIG. 3, records of the process data DB 2021 and the device data DB 2022 include an item "sensor ID", an item "device name", an item "sensor name", and an item "measurement value".

The item "sensor ID" is information for identifying a sensor.

The item "device name" is information indicating a type of a device to which each sensor corresponding to the sensor ID is attached. The device name stores information on a name for identifying a type of a device and identifying the device, such as pump A, pump B, and pump C. Note that the name indicating a device may be a code specified based on a prescribed standard or the like or may be a model number or the like specified by a manufacturer.

The item "measurement value" is a value indicating a measurement value obtained by each sensor corresponding to the sensor ID.

5. Outline of Control Process

An outline of a control process by the management system 1 will be described below.

Figure 4:
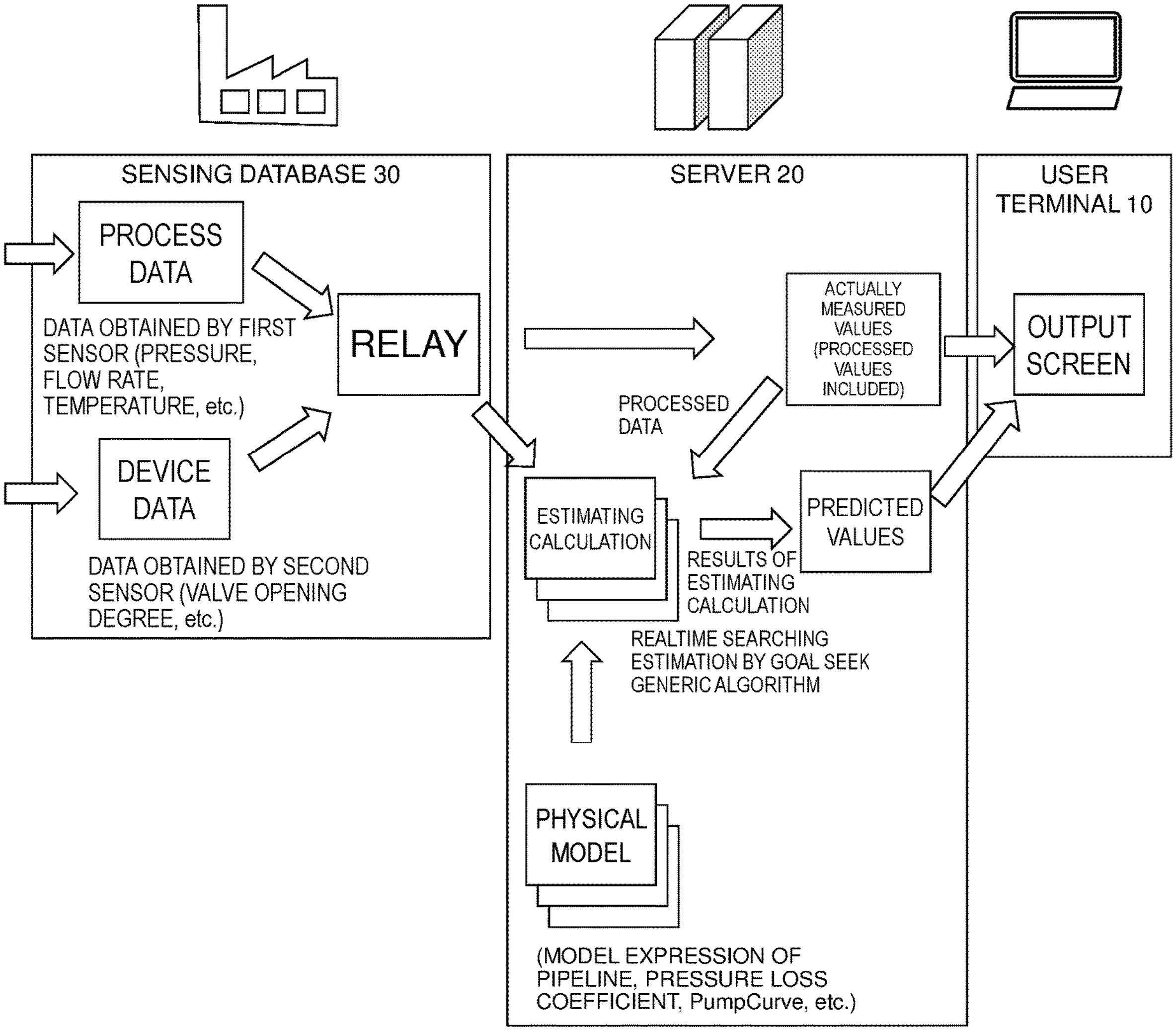
FIG. 4 is a diagram for describing an outline of a control process by a management system 1.

FIG. 4 is a diagram for describing the outline of the control process by the management system 1.

As illustrated in FIG. 4, in a plant, the first sensors and the second sensors provided in the devices perform sensing. Obtained sensor data are collected in the sensing database 30 in chronological order.

The obtained sensor data is transmitted via a relay to the server 20. The sensor data transmitted to the server 20 is partly subjected to required processing to be available for computation performed later. As the required processing, for example, processing of calculating a differential pressure indicating a difference in pressure between two points or calculating a difference in flow rate between the two points is performed.

Next, the computation module 2033 performs a process of an estimating calculation using the physical model, the sensor data, and processed data. The estimating calculation will be described later in detail. Results obtained from the estimating calculation are transmitted as predicted values to the user terminals 10. The predicted values are displayed together with processed values and the sensor data on display screens of the user terminals 10.

6. Outline of Estimating Calculation

An outline of the estimation processing on parameters using the physical model will be described below.

For example, it is known that a pressure loss of fluid in a pipe is given by Model Expression (1) shown below.

$$\text{Pressure loss in pipe} = k * f(F, \rho) \tag{1}$$

k: Loss parameter

F: Flow rate of fluid

ρ: Density of fluid (F, ρ): Function of flow rate and density of fluid as variables

*: Represents product

Here, the parameter k is a parameter that is determined based on a shape of the pipe and a degree of contamination of an inside of the pipe. The parameter k is basically constant irrespective of the operating condition but may vary based on the internal contamination, clogging, or the like of the inside.

In view of this, the estimating calculation will be described with a piping system in a line by way of example. FIG. 5 is a diagram for describing the estimating calculation performed by the server 20.

In a pipeline illustrated in FIG. 5A is a pipeline through which fluid flows from a container at the top left to a tank at the bottom right. The pipe is provided with a pump P and a valve V in the middle of the pipe.

In this case, Model Expression (2) shown below is established as the physical model.

$$P(t)=P1(t)+\text{Pump}\,f(F(t),\rho(t),\text{act.pump curve})-k1(t)*f(F(t),\rho(t),\text{Machine.in}) \quad (2)$$

P1: Container pressure

Pc: Pressure at intermediate point (between valve and pump)

Pump ((t), ρ (t), act.pump curve): Pressure rise by pump (t)*f(F(t), ρ(t), Machine.in): Pressure loss between container and intermediate point Machine,in: Pressure of inflow into device immediately downstream of intermediate point (t): Loss parameter between container and intermediate point Expression (2) shows that a pressure rise by the pump is given by a function of a flow rate F, a density ρ, and a pump curve denoted as act.pump curve as its variables. The pump curve is a function describing physical properties of the pump as a function of the flow rate. The pump curve is substantially determined from design values of the pump and gradually varies with deterioration over time and the like.

Further, in the pipeline illustrated in FIG. 5A, Model Expression (3) shown below is established as the physical model.

$$P2(t)=\text{Pc}(t)-CV\,f(F(t),\rho(t),\text{act.OP}(t),CV\text{ curve})-k2(t)*f(F(t),\rho(t),\text{Machin.out}) \quad (3)$$

(t): Pressure at intermediate point (between valve and pump)

(t): Tank pressure

CV ((t), ρ(t), act.OP(t), CV curve): Pressure drop by valve (t)*f(F(t), ρ(t), Machin.out): Pressure loss between intermediate point and tank Machine.out: Pressure of outflow from device immediately downstream of intermediate point (t): Loss parameter between intermediate point and tank Expression (3) shows that a pressure drop by the valve is given by a function of the flow rate F, the density ρ, a degree of opening of the valve denoted as act.OP(t)CV curve, and a valve curve act.pump curve as its variables. The degree of opening of the valve is a value that is measured by a second sensor. The valve curve is a function describing physical properties of the valve as a function of the flow rate. The valve curve is substantially determined from design values of the valve and gradually varies with deterioration over time and the like.

Among the variables input into these model expressions, the pressure, the flow rate, the density, and the like are measured by first sensors, and the degree of opening of the valve is measured by the second sensor.

These Expression (2) and Expression (3) mean that an outlet (or intermediate) pressure can be calculated from an inlet pressure with pressure fluctuations of the devices such as a pipe and a pump taken into account, although varying depending on the disposition and configurations of devices in the system.

Expression (2) determines a pressure at an intermediate point Pc by calculating an inlet pressure P1, a pressure rise by the pump, and a pressure reduction by a pipe. With Expression (3), an outlet pressure (tank pressure) P2 can be determined by calculating an intermediate pressure Pc, a pressure drop by the valve and the pressure reduction by the pipe.

By selecting such parameters that cause the outlet pressures calculated by the expressions to match an actually measured outlet pressure, the parameters that reconstruct the actualities can be determined, and thus the validity of the physical model can be verified. By checking a pressure balance at varied flow rates using the physical model, the validity of which has been confirmed, it is possible to estimate pressures at the flow rates. For example, when a maximum degree of opening of the valve is substituted into the physical model, a maximum flow rate and a pressure balance at the maximum flow rate can be estimated.

Although this description is about expressions for determining the outlet pressures, the expressions may have forms for estimating inlet pressures, and a parameter to be calculated can be optionally changed. Further, the physical models given by Expression (2) and Expression (3) are merely examples and can be optionally changed based on a structure of a pipeline to which the physical models are applied.

When the estimation is performed using these model expressions, loss parameters k1 and k2 are first determined. The loss parameters are determined by referring to past data.

Next, the physical model is verified. As shown in FIG. 5B, a pressure (actually measured value), a valve opening degree (actually measured value), and a flow rate (actually measured value) are substituted into the physical model in which specified loss parameters are employed, to calculate a predicted value of a tank pressure. Then, whether the predicted value of the tank pressure indicates a value close to an actually measured value of the tank pressure is checked. In the example shown in FIG. 5B, while the calculated tank pressure is 195 kPa, its actually measured value is 200 kPa. The calculated value has a deviation that falls within about 2.5% from the actually measured value, and it is thus confirmed that the physical model is valid.

Note that if the calculated value of the tank pressure diverges from its actually measured value, there is a concern that the loss parameters of the physical model are likely to be improper or that any of the devices may deteriorate. Among these, the loss parameters of the physical model are unlikely to diverge in a short time because the loss parameters are calculated from past operating conditions and past measurement values. For that reason, when the calculated value of the tank pressure diverges from its actually measured value, any of the devices may deteriorate, decreasing in performance. Therefore, it is speculated that an anomaly occurs in a device that is associated with physical properties included in the physical model.

Next, the estimating calculation of the maximum processing amount is performed. At that time, the management system 1 determines an optimal operating condition by searching for a solution using a genetic algorithm and estimates the maximum processing amount based on the operating condition. Specifically, as illustrated in FIG. 5C, a value of an upper limit degree of opening is set for each valve as the valve opening degree. In the example illustrated in the diagram, the valve opening degree is set to 85%. Then, the tank pressure is calculated at various values of the flow rate to search for a value of the flow rate at which the calculated value of the tank pressure matches the measurement value of the tank pressure. In the example illustrated in the diagram, the calculated value of the tank pressure matches its actually measured value under the operating condition indicating a flow rate of 180 $m^3/h$. Therefore, the maximum processing amount is estimated at 180 $m^3/h$ (indicated by dashed line).

7. Operation of Management System 1

Figure 6:
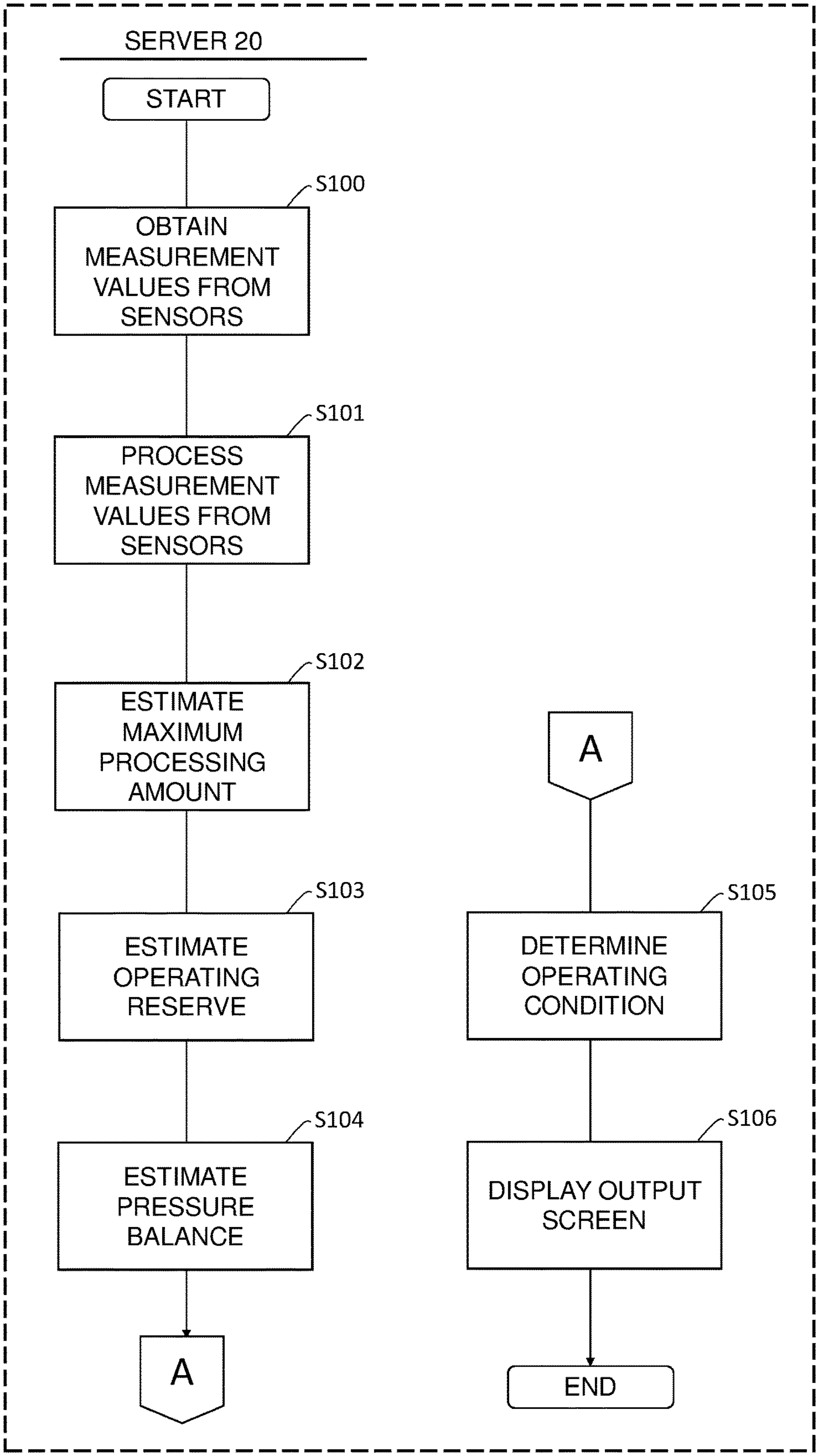
FIG. 6 is a diagram illustrating an operation flow of the management system 1.

The operation of the management system 1 will be described below. FIG. 6 is a diagram illustrating an operation flow of the management system 1.

As illustrated in FIG. 6, the server 20 obtains measurement values of the sensors from the sensing database 30 (step S100). Specifically, the measurement value obtaining module 2032 of the server 20 obtains, via the transmission/reception control module 2031, the measurement values of the sensors that are transmitted from the relay of the sensing database 30. The measurement values of the sensors include process data and device data.

After step S100, the server 20 processes the measurement values of the sensors (step S101). Specifically, the computation module 2033 of the server 20 subjects the measurement values of the sensors to a calculation process that is the required processing for subsequent computation, such as a calculation of a differential pressure and a calculation of a flow rate difference.

After step S101, the server 20 estimates the maximum processing amount (step S102). Specifically, the computation module 2033 of the server 20 substitutes the measurement values and the processed measurement values into the physical model to calculate and estimate the maximum processing amount. The calculation of the maximum processing amount may be performed by searching for a solution using a genetic algorithm as described above. In a case where the genetic algorithm is not employed, a solution may be searched for by the response surface methodology. In this case, a certain number of possible solutions are prepared in advance and substituted by trial and error to search for a proper solution.

After step S102, the server 20 estimates the operating reserve (step S103). Specifically, the computation module 2033 of the server 20 determines a difference between the estimated maximum processing amount and a current processing amount to estimate how much the operating reserve currently remains.

After step S103, the server 20 estimates the pressure balance (step S104). Specifically, from measured pressures from the sensors, the computation module 2033 of the server 20 may confirm the pressure balance in the pipeline. It is possible to determine whether the pressure balance is normal or not by comparing the pressure balance with, for example, a predetermined threshold value that is set in advance. An anomaly in the pressure balance enables the detection of a malfunction occurring somewhere along the pipeline.

After step S104, the server 20 determines the operating condition (step S105). Specifically, based on results from the estimations by the computation module 2033 of the server 20, the computation module 2033 determines an optimal operating condition. For example, a degree of opening of the valve determined based on the estimated maximum processing amount can be set as the operating condition. Further, the estimated optimal operating condition can be used to consider an operating condition to be subsequently used.

After step S105, the server 20 displays an output screen (step S106). Specifically, the transmission/reception control module 2031 of the server 20 outputs an output screen concerning the operating state and the predicted values to the user terminals 10.

The processing by the management system 1 is terminated in the above manner.

8. Example Screen

Figure 7:
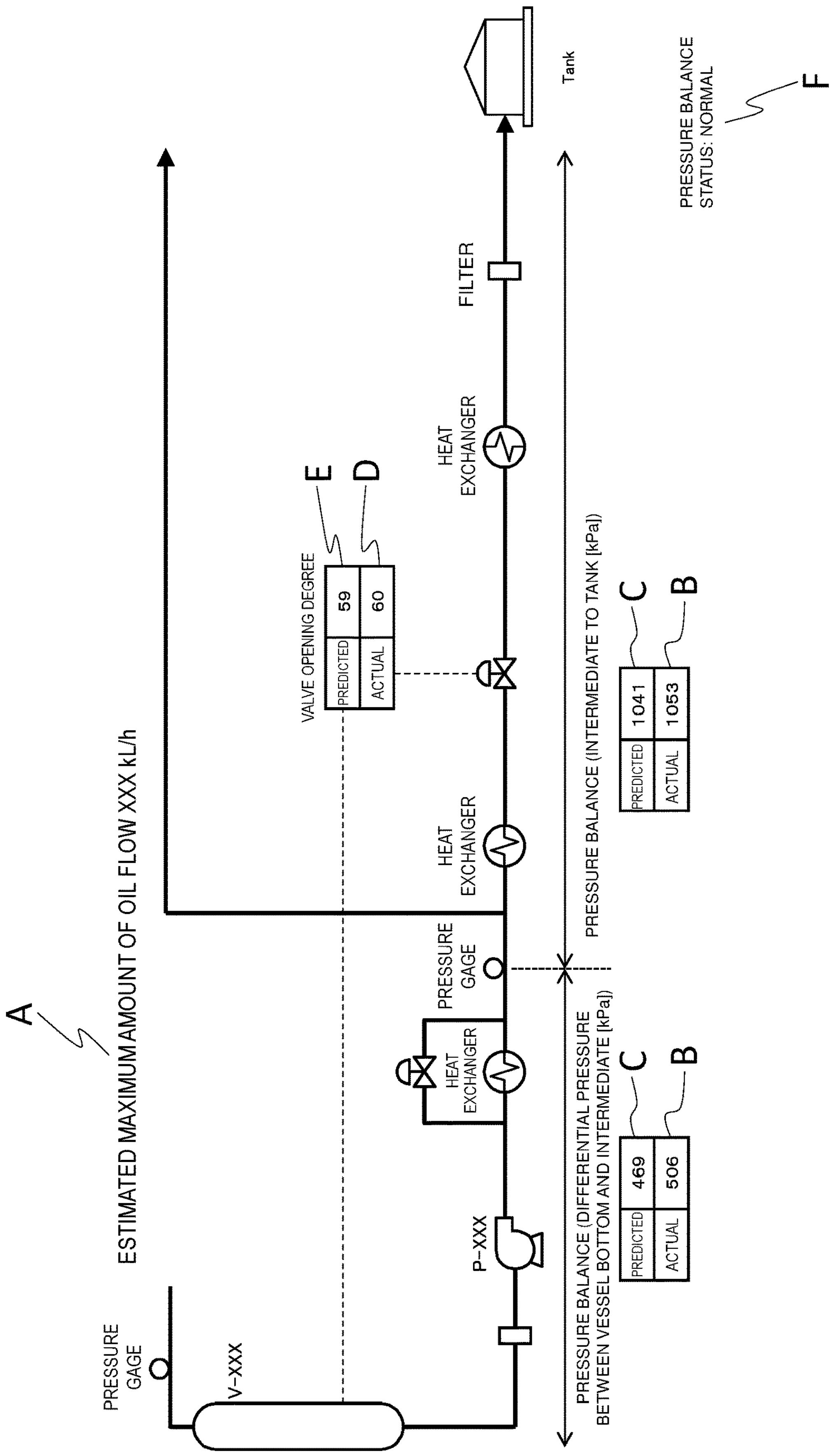
FIG. 7 is a diagram illustrating an example of an output screen in the management system 1.

Next, an example of the output screen from the management system 1 will be described. FIG. 7 is a diagram illustrating the example of the output screen in the management system 1. Note that the diagram is merely an example. The output screen can be optionally changed.

As illustrated in FIG. 7, the output screen of a user terminal 10 shows the estimated maximum processing amount (sign A). By checking the maximum processing amount, how much the reserve remains in the operation of the pipeline can be grasped. Further, the operating reserve may be displayed together.

The output screen also displays actually measured values of pressures from sensors (signs B), and predicted values of the pressures estimated (signs C). In this manner, the output screen displays an actual operating state and the predicted values calculated by the estimating calculation. By comparing these values with one another, the validity of the physical model used in the computational processing can be checked.

The output screen also displays an actually measured value of a degree of opening of a valve (sign D), and a predicted value of the degree of opening estimated (sign E). For example, when the operating condition to be subsequently used is considered, the predicted valve opening degree may be set as the operating condition to yield the estimated maximum processing amount.

The output screen also displays information as to whether the pressure balance in the pipeline is normal (sign F). If the pressure balance is lost, a display of the pressure balance not being normal is given.

<Modification>

Figure 8:
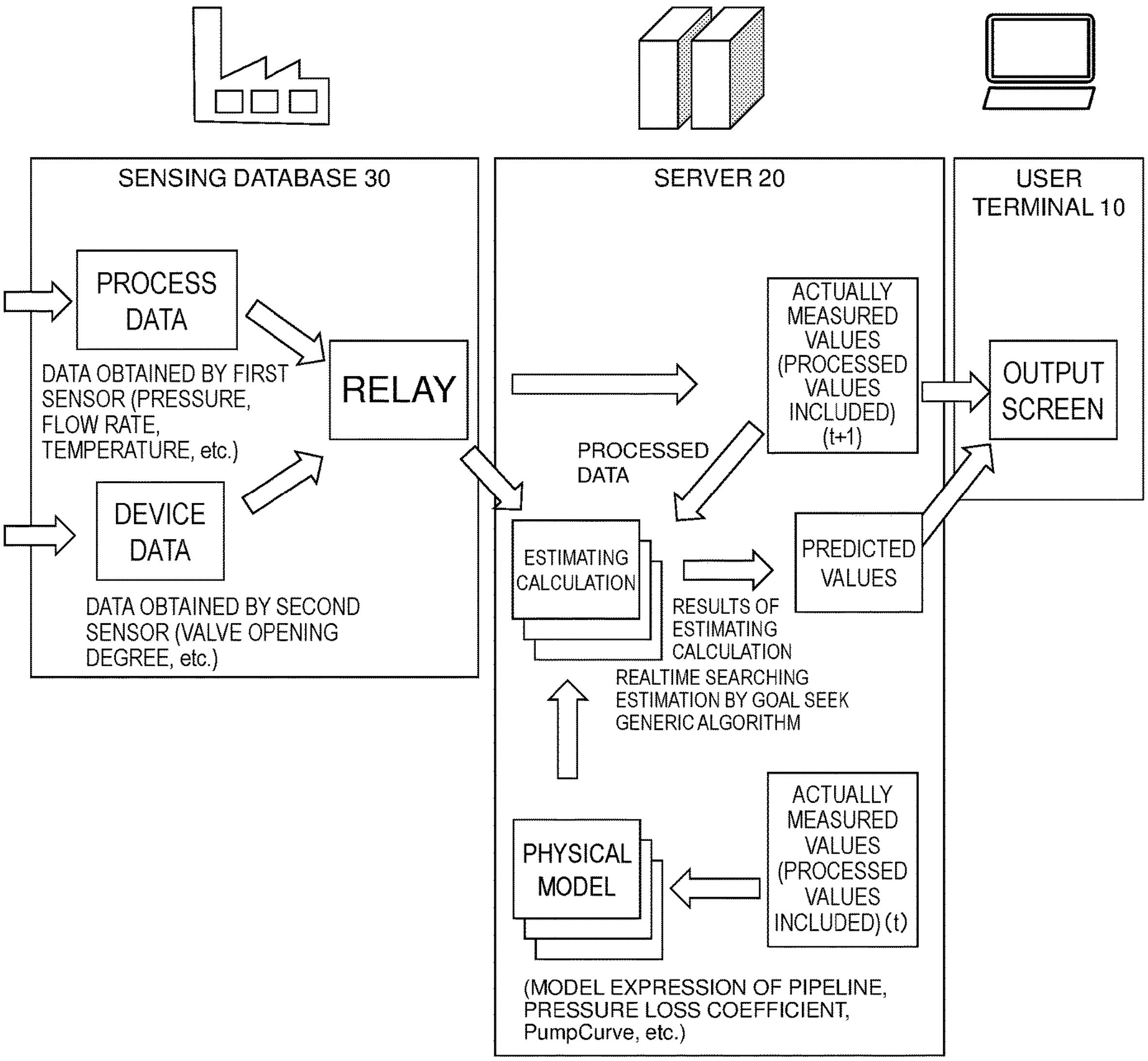
FIG. 8 is a diagram for describing an outline of a control process by a management system 1 according to a modification.

Next, a modification of the management system 1 will be described. FIG. 8 is a diagram for describing an outline of a control process by a management system 1 according to a modification. The management system 1 according to the modification performs a process of searching for parameters of the physical model by using goal seeking method and immediately preceding actually measured values and updating the physical model with an estimated optimal solution. The update of the physical model by such an estimating calculation will be described with reference to FIG. 9. FIG. 9 is a diagram for describing the estimating calculation performed by a server 20 of the management system 1 according to Modification 1.

In a pipeline illustrated in FIG. 9A, a solution of values of the parameters k that makes an actually measured value of a tank pressure match a predicted value of the tank pressure is searched for from current data (time t) using a genetic algorithm with various values automatically input into k1 and k2. Optimal values of the parameters k are thereby determined (signs G in FIG. 9B).

Next, after the values of the parameters k are determined, these values and process data collected in the past are substituted into the physical model to check validity of the physical model.

Next, as shown in FIG. 9C, when new, subsequent data (time t+1) is input, the subsequent data is substituted into the physical model into which the values of the parameters k already obtained have been input, and a value of the flow rate at a valve opening degree set to its tolerable MAX value is checked. Then, a solution of the flow rate that makes the predicted value of the tank pressure matches the actually measured value of the tank pressure is searched for using the genetic algorithm. In the case shown in the diagram, the maximum processing amount is estimated at 180 $m^3/h$ as indicated by dashed line.

As described above, calculating the optimal parameters of the physical model by searching for a solution by the genetic algorithm with the immediately preceding actually measured values from the sensors enables the physical model to be updated accurately and easily.

<Other Modifications>

Other modifications will be described.

The above embodiment is described such that the valve opening degree is device data obtained by the second sensor as an example. However, such a mode is not limitative. The device data obtained by the second sensor may be optionally changed to any data that indicates states concerning behaviors of the devices.

In the above embodiment, the valve opening degree is estimated for an optimal operating condition. However, such a mode is not limitative. Optimal values of various operating conditions can be estimated by changing the physical model. For example, the operation control module 2035 may determine optimal pumping pressures to tanks included in the devices from the estimated maximum processing amount. In this case, the pumping pressure can be determined by estimating an inlet pressure of the tank and converting the pressure into a liquid level in the tank.

In the above embodiment, the state determination module 2034 detects a malfunction of each device based on the pressure balance. However, such a mode is not limitative. By changing the physical model, the state determination module 2034 may identify, from among the devices constituting the pipeline, a part that is a bottleneck in the entire line. In this case, the part being the bottleneck can be identified by building a physical model for each of a plurality of evaluation sections that are set to the pipeline to be evaluated and comparing maximum processing amounts estimated for the respective sections. Further, the comparison of the maximum processing amounts estimated for the respective sections enables the estimation of a balance among maximum processing amounts of a plurality of pipelines connected together.

Figure 10:
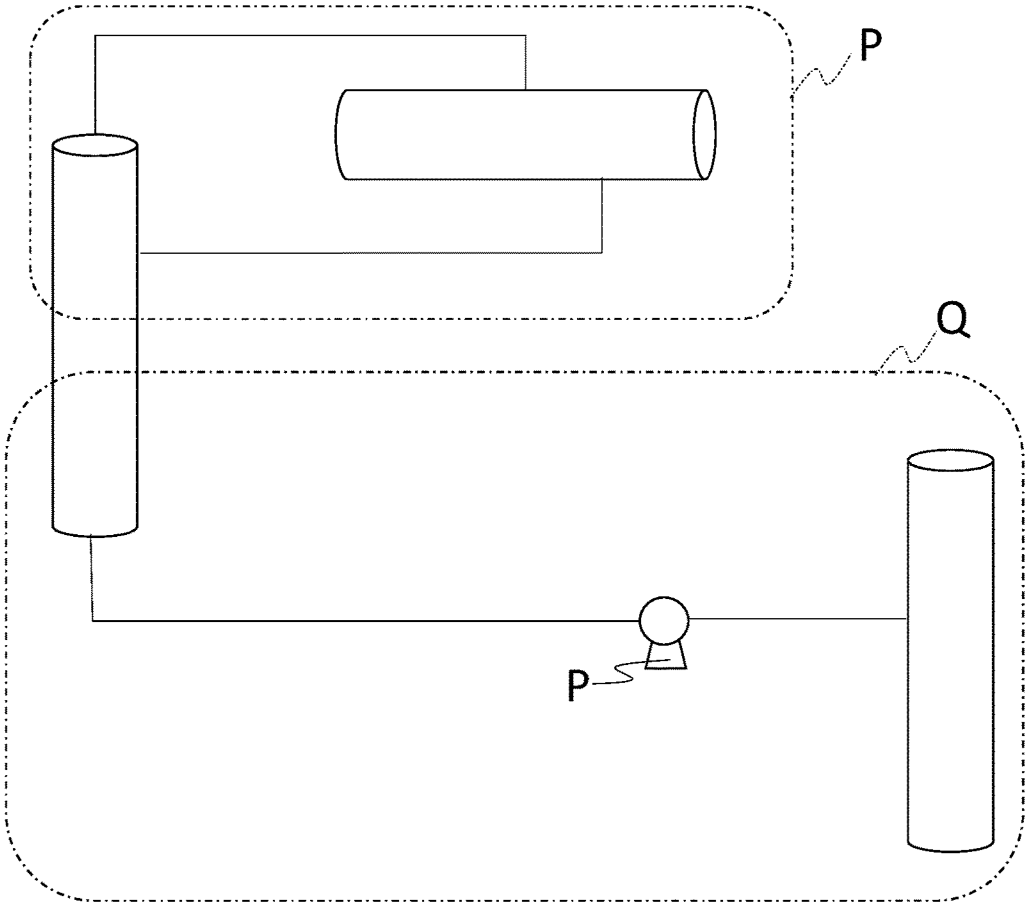
FIG. 10 is a diagram illustrating an example of a piping system constituted by a plurality of pipelines.

For example, a plurality of evaluation sections P and Q are set in a piping system constituted by a plurality of pipelines as illustrated in FIG. 10. By evaluating a maximum processing amount in each section, the part being the bottleneck can be identified.

The embodiments according to the disclosure are described above. These embodiments can be embodied in other various forms and can be embodied with various omissions, substitutions, and changes. These embodiments and modifications as well as those subjected to the omissions, substitutions, and changes are included in the technical scope of claims and the scope of equivalents thereof.

Further, an order of the processes can be changed to the extent that the order is not inconsistent.

The matters described in the embodiments described will be supplemented below.

(Supplement 1)

A management system for managing an operating condition for a pipeline that processes fluid, the management system comprising a processor configured to:

obtain measurement values from sensors provided in devices that constitute the pipeline; and estimate a maximum processing amount of the fluid in the entire pipeline in operation by inputting the measurement values obtained from the sensors into a physical model that is built based on physical properties of the devices.

(Supplement 2)

The management system according to (Supplement 1), wherein the sensors comprise:

a first sensor that measures process data indicating a state of the fluid flowing through the pipeline; and second sensors that measure device data indicating states of the devices.

(Supplement 3)

The management system according to (Supplement 2), wherein the device data obtained by the second sensors comprises actually measured values of valve opening degrees included in the devices, the valve opening degrees being obtained by mechanically measuring degrees of opening of valves included in the devices.

(Supplement 4)

The management system according to any one of (Supplement 1) to (Supplement 3), wherein the processor further configured to:

calculate an operating reserve of the pipeline based on the estimated maximum processing amount, and perform a step of determining the operating condition of the pipeline within the calculated operating reserve.

(Supplement 5)

The management system according to (Supplement 4), wherein in determining the operating condition, the processor configured to determine degrees of opening of valves included in the devices within the calculated operating reserve.

(Supplement 6)

The management system according to any one of (Supplement 1) to (Supplement 5), wherein the processor configured to display an operating state of the entire pipeline or operating states of the devices based on the estimated maximum processing amount.

(Supplement 7)

The management system according to any one of (Supplement 1) to (Supplement 6), wherein the processor configured to estimate a pressure balance in the entire pipeline based on the estimated maximum processing amount.

(Supplement 8)

The management system according to any one of (Supplement 1) to (Supplement 7), wherein the processor further configured to specify pumping pressures to tanks included in the devices based on the estimated maximum processing amount.

(Supplement 9)

The management system according to any one of (Supplement 1) to (Supplement 8), wherein the processor configured to evaluate performances of the devices based on the estimated maximum processing amount and detects a deterioration in performance of each device.

(Supplement 10)

The management system according to any one of (Supplement 1) to (Supplement 9), wherein the processor configured to correct the physical model from past measurement values collected.

(Supplement 11)

The management system according to any one of (Supplement 1) to (Supplement 10), wherein the processor further configured to identify, from among the devices constituting the pipeline, a part that is a bottleneck in an entire line.

(Supplement 12)

The management system according to any one of (Supplement 1) to (Supplement 11), wherein the processor configured to estimate a balance among maximum processing amounts of a plurality of pipelines connected together.

(Supplement 13)

The management system according to any one of (Supplement 1) to (Supplement 12), wherein in estimating the maximum processing amount, the processor configured to determine an optimal operating condition by searching for a solution using a genetic algorithm, and estimate the maximum processing amount based on the operating condition.

(Supplement 14)

A management method for managing an operating condition for a pipeline that processes fluid, the management method being performed by a management system comprising a processor, wherein the processor:

obtain measurement values from sensors provided in devices that constitute the pipeline; and estimate a maximum processing amount of the fluid in the entire pipeline in operation by inputting the measurement values obtained from the sensors into a physical model that is built based on physical properties of the devices.

(Supplement 15)

A management program for managing an operating condition for a pipeline that processes fluid, the management program including a processor, the management program causing the processor to perform:

a step of obtaining measurement values from sensors provided in devices under an operating condition; and a step of estimating a maximum processing amount of the fluid in the entire pipeline in operation by inputting the measurement values obtained from the sensors into a physical model that is built based on physical properties of the devices constituting the pipeline.

What is claimed is:

1. A management system for managing an operating condition for a pipeline that processes fluid, the management system comprising a processor configured to:

obtain measurement values from sensors provided in devices that constitute the pipeline; and estimate a maximum processing amount of the fluid in the entire pipeline in operation by inputting the measurement values obtained from the sensors into a physical model that is built based on physical properties of the devices; and adjust the operating condition for the pipeline based on results from the estimation of the maximum processing amount of the fluid;

wherein:

in estimating the maximum processing amount, the processor further configured to:

cause the physical model to output a predicted value of a pressure in the pipeline by inputting an upper limit value of a specific physical quantity relating to behavior of at least one of the devices that is provided in the pipeline and constitutes the pipeline into the physical model;

cause the physical model to output the predicted value with a process value other than the pressure in the pipeline being changed, and compare the predicted value with an actually measured value of the corresponding pressure; and estimate a value of the flow rate at which the predicted value matches the actually measured value, as the maximum processing amount.

2. The management system according to claim 1, wherein the upper limit value of the specific physical quantity relating to the behavior of at least one of the device is a preset upper limit value of a degree of opening of a valve.

3. The system according to claim 1, wherein the process value other than the pressure in the pipeline is a flow rate in the pipeline.

4. The management system according to claim 1, wherein the processor configured to, prior to estimating the maximum processing amount:

cause the physical model to output the predicted value of the pressure in the pipeline by inputting an actually measured value of the specific physical quantity measured by the device provided in the pipeline into the physical model; and check validity of the physical model by comparing the predicted value of the pressure corresponding to an actually measured value of the specific physical quantity measured by the device with the actually measured value of the corresponding pressure.

5. The management system according to claim 1, wherein the processor further configured to:

cause the physical model to output a predicted value of a specific physical quantity of each device of the pipeline in operation by inputting the measurement values obtained from the sensors into the physical model; and detect a deterioration in performance of each device by comparing the output predicted value with an actually measured value of the physical quantity corresponding to the predicted value.

6. The management system according to claim 1, wherein the processor further configured to display, on an output screen that indicates the pipeline, a predicted value of the pressure in the pipeline at the estimated maximum processing amount and an actually measured value of the corresponding pressure in the pipeline.

7. The management system according to claim 1, wherein the processor further configured to specify, based on the estimated maximum processing amount, an optimal pumping pressure at the maximum processing amount by estimating a pressure at an inlet of a tank from a physical model relating to the tank, the tank being one of the devices constituting the pipeline, and by converting the estimated pressure at the inlet of the tank into a liquid level in the tank.

8. The management system according to claim 1, wherein the processor further configured to identify a part of the pipeline being a bottleneck in the entire pipeline by setting a plurality of evaluation sections to the pipeline to be evaluated, build the physical model for each evaluation section, and compare the maximum processing amounts that are estimated for the respective evaluation sections.

9. The management system according to claim 1, wherein the pipeline includes a plurality of pipelines, and the processor further configured to estimate a balance among the maximum processing amounts of the plurality of pipelines connected together by setting a plurality of evaluation blocks to the pipeline to be evaluated, building the physical model for each section, and comparing maximum processing amounts that are estimated for the respective evaluation sections.

10. A management method for managing an operating condition for a pipeline that processes fluid, the management system comprising a processor, wherein the processor:

obtains measurement values from sensors provided in devices that constitute the pipeline; and estimates a maximum processing amount of the fluid in the entire pipeline in operation by inputting the measurement values obtained from the sensors into a physical model that is built based on physical properties of the devices; and adjusts the operating condition for the pipeline based on results from the estimation of the maximum processing amount of the fluid;

wherein:

in estimating the maximum processing amount, the processor further:

causes the physical model to output a predicted value of a pressure in the pipeline by inputting an upper limit value of a specific physical quantity relating to behavior of at least one of the devices that is provided in the pipeline and constitutes the pipeline into the physical model;

causes the physical model to output the predicted value with a process value other than the pressure in the pipeline being changed, and compare the predicted value with an actually measured value of the corresponding pressure; and estimates a value of the flow rate at which the predicted value matches the actually measured value, as the maximum processing amount.

11. A non-transitory computer-readable storage medium, storing computer-readable instruction thereon, which, when executed by a processor to execute a method for managing an operating condition for a pipeline that processes fluid, comprising:

obtaining measurement values from sensors provided in devices that constitute the pipeline; and estimating a maximum processing amount of the fluid in the entire pipeline in operation by inputting the measurement values obtained from the sensors into a physical model that is built based on physical properties of the devices; and adjusting the operating condition for the pipeline based on results from the estimation of the maximum processing amount of the fluid;

wherein:

in estimating the maximum processing amount, the method comprising:

causing the physical model to output a predicted value of a pressure in the pipeline by inputting an upper limit value of a specific physical quantity relating to behavior of at least one of the devices that is provided in the pipeline and constitutes the pipeline into the physical model;

causing the physical model to output the predicted value with a process value other than the pressure in the pipeline being changed, and comparing the predicted value with an actually measured value of the corresponding pressure; and estimating a value of the flow rate at which the predicted value matches the actually measured value, as the maximum processing amount.

* * * * *